United States Patent
Cherubini et al.

(10) Patent No.: US 8,054,568 B2
(45) Date of Patent: Nov. 8, 2011

(54) SYNCHRONIZATION OF SYMMETRIC TIMING BASED SERVO BURSTS

(75) Inventors: Giovanni Cherubini, Rueschlikon (CH); Robert Allen Hutchins, Tucson, AZ (US); Jens Jelitto, Rueschlikon (CH); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/712,039

(22) Filed: Feb. 24, 2010

(65) Prior Publication Data

US 2011/0205657 A1    Aug. 25, 2011

(51) Int. Cl.
*G11B 5/09* (2006.01)
*G11B 5/584* (2006.01)

(52) U.S. Cl. .............. 360/48; 360/51; 360/77.12

(58) Field of Classification Search .................. None
See application file for complete search history.

(56) References Cited

U.S. PATENT DOCUMENTS

| | | | | |
|---|---|---|---|---|
| 4,105,863 | A | 8/1978 | Kustka | 178/67 |
| 5,448,430 | A | 9/1995 | Bailey et al. | 360/77.12 |
| 5,930,065 | A | 7/1999 | Albrecht et al. | 360/72.2 |
| 6,049,438 | A | 4/2000 | Serrano et al. | 360/49 |
| 6,580,581 | B1 | 6/2003 | Bui et al. | 360/78.02 |
| 6,842,305 | B2 | 1/2005 | Molstad et al. | 360/77.12 |
| 6,879,457 | B2 | 4/2005 | Eaton et al. | 360/75 |
| 6,989,950 | B2 | 1/2006 | Ohtsu | 360/48 |
| 7,193,800 | B2 | 3/2007 | Coker et al. | 360/48 |
| 7,203,026 | B2 | 4/2007 | Horimai | 360/77.12 |
| 7,529,061 | B2 | 5/2009 | Bui et al. | 360/77.12 |
| 2008/0117539 | A1 | 5/2008 | Bui et al. | 360/48 |
| 2009/0174964 | A1 | 7/2009 | Cherubini et al. | 360/77.12 |
| 2009/0219648 | A1* | 9/2009 | Jaquette | 360/77.12 |
| 2010/0079890 | A1* | 4/2010 | Brummet | 360/40 |

OTHER PUBLICATIONS

"Timing-Based Track-Following Servo for Linear Tape Systems", IEEE Transactions on Magnetics, vol. 34, No. 4, Jul. 1998, pp. 1872-1877.
"LPOS for Timing-Based-Servo With Trinary Partial-Response Maximum-Likelihood", IBM, IPCOM000176068D, Nov. 4, 2008, pp. 1-5.
"Least-Squares Calculation of Timing-Based-Slope From Compound M-Pattern Timing-Based-Servo", IBM, IPCOM000152776D, May 11, 2007, pp. 1-3.

* cited by examiner

*Primary Examiner* — Daniell L Negron
*Assistant Examiner* — Regina N Holder
(74) *Attorney, Agent, or Firm* — John H. Holcombe

(57) ABSTRACT

Timing based servo bursts of servo frames, in which the frames are arranged to be symmetric with the same number of servo stripes in each burst of a frame, are synchronized by shifting selected bits. For example, servo frames are arranged with four servo bursts with an equal number of servo stripes in each burst, the servo frames comprising two symmetric sub-frames, each sub-frame comprising two bursts of servo stripes that are parallel to each other within a burst, and the bursts are non-parallel with respect to each other; each servo burst is arranged to comprise at least one reference servo stripe; and each servo burst is arranged to comprise at least one shifted servo stripe, wherein the shift is in the same longitudinal direction with respect to at least one reference servo stripe for each burst of a frame and the opposite longitudinal direction for bursts of sequentially adjacent frames.

25 Claims, 10 Drawing Sheets

SYNCHRONIZATION OF SYMMETRIC TIMING BASED SERVO BURSTS

DOCUMENT INCORPORATED BY REFERENCE

Commonly assigned U.S. Pat. No. 5,689,384 is incorporated for its showing of timing based servo arrangements; and commonly assigned U.S. Pat. No. 5,930,065 is incorporated for its showing of timing based servo arrangements with shifted bits to provide additional information.

FIELD OF THE INVENTION

This invention relates to linear tape media, and more particularly to track following timing based servo arrangements.

BACKGROUND OF THE INVENTION

Timing based servo arrangements are employed with respect to linear tape media, for example, in magnetic tape systems, to provide track following capability. Recorded servo patterns comprise dual magnetic transitions called "servo stripes" arranged as pairs recorded at more than one azimuthal orientation across the tape media. The technology is discussed in the incorporated U.S. Pat. No. 5,689,384. Reading a servo pattern by a servo read head yields a sequence of pulses called "dibits", where each dibit corresponds to the transitions at both edges of a servo stripe written on the magnetic medium. The timing between dibits that correspond to any pair of servo stripes with different azimuthal orientation thus varies continuously as the servo read head is moved in the lateral direction across the servo band. The pattern is read by a servo read head whose width is small compared to the servo band pattern, and servo head position is derived from the relative timing of pulses generated by the servo head reading the servo pattern as the tape is moved in the longitudinal direction. Position sensing with this system is achieved by deriving a ratio of two servo pattern intervals, one pattern interval comprising the timing between dibits corresponding to a pair of servo stripes having different azimuthal orientation, and the other pattern interval comprising the timing between dibits corresponding to a pair of servo stripes having the same azimuthal orientation. Thus, the position sensing is ratio dependent and is insensitive to tape speed.

A typical way to determine which servo stripe is being read is to arrange the servo stripes into servo frames, each frame having two sub-frames, each with two bursts of servo stripes arranged in patterns with different azimuthal orientations. A pattern interval between dibits in the servo signal is provided for servo stripes within a sub-frame, and another pattern interval is between sub-frames. Typically, frames and sub-frames are distinguished by having a different number of servo stripes in the bursts of one sub-frame as compared to the other sub-frame. As one example, the frames and sub-frames are easily distinguished by observing the counts of servo stripes in each burst, such as 5, 5, 4, 4, within a frame, the 5, 5 count bursts comprising one sub-frame, and the 4, 4 count bursts comprising the other sub-frame.

A drawback of asymmetric numbers of servo stripes in each frame is that the extra servo stripes result in longer frames, reducing the rate of generation of lateral position estimates from the servo signals, as the lateral position estimates are generated on a frame by frame basis.

SUMMARY OF THE INVENTION

Methods, magnetic tape media, sensible transition patterns, a magnetic tape servo writer, and a magnetic tape servo detection system are provided with respect to synchronization of timing based servo bursts of servo frames of a servo band, in which the frames are arranged to be symmetric with the same number of servo stripes in each burst of a frame.

In one embodiment, servo frames are arranged with four servo bursts with an equal number of servo stripes in each burst, the servo frames comprising two symmetric sub-frames, each sub-frame comprising two bursts of servo stripes that are parallel to each other within a burst, and the bursts are non-parallel with respect to each other;

each servo burst is arranged to comprise at least one reference servo stripe; and each servo burst is arranged to comprise at least one shifted servo stripe, wherein the shift is in the same longitudinal direction with respect to at least one reference servo stripe for each burst of a frame and in the opposite longitudinal direction for bursts of sequentially adjacent frames.

In a further embodiment, the step of arranging reference servo stripes comprises arranging the reference servo stripes to be in the same servo stripe count position within each burst; and the step of arranging the shifted servo stripes comprises arranging the shifted servo stripes to be in the same servo stripe count position within each burst.

In another embodiment, the step of arranging reference servo stripes comprises arranging the one reference servo stripe at the same outer edge of each said burst.

In a further embodiment, the shifted servo stripe of each burst is independent of any modulated longitudinal position (LPOS) servo stripe in the burst.

In another embodiment, wherein each burst comprises three servo stripes; the step of arranging the reference servo stripes comprises arranging at least one reference servo stripe of each burst at the interior position of the burst; and the step of arranging the shifted servo stripe comprises arranging the shifted servo stripe at an edge of each burst, adjacent the reference servo stripe.

In still another embodiment, wherein the step of arranging the reference servo stripes comprises arranging the reference servo stripes as the outer servo stripes of each burst; and the step of arranging the shifted servo stripes comprises arranging at least one shifted servo stripe as an interior servo stripe of each burst.

In a further embodiment, wherein each burst comprises four servo stripes; the step of arranging the shifted servo stripes comprises arranging at least one shifted interior servo stripe of each burst to be adjacent one of the reference servo stripes.

In another embodiment, wherein each burst comprises five servo stripes; the step of arranging the shifted servo stripes comprises arranging at least one shifted interior servo stripe of each burst adjacent one of the reference servo stripes.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
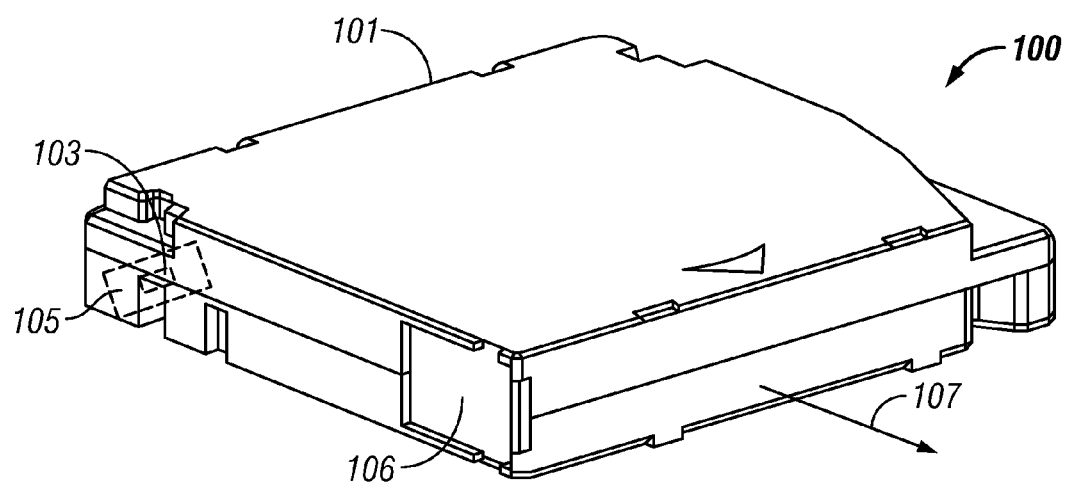
FIG. 1 is an illustration of a magnetic tape cartridge.
Figure 2:
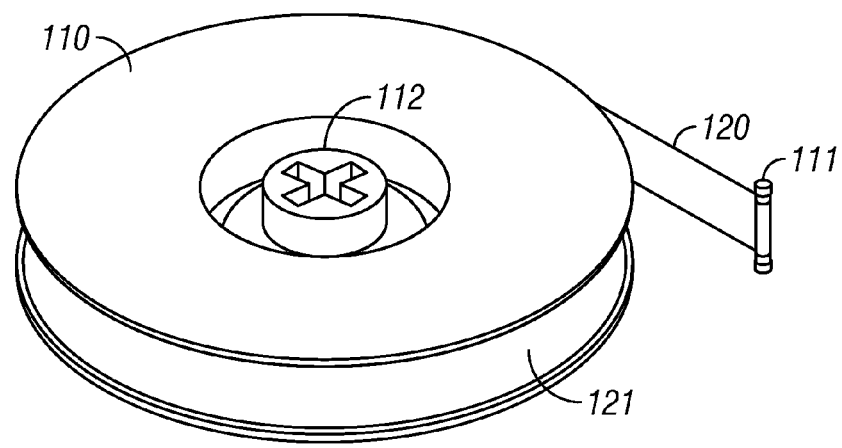
FIG. 2 is an illustration of a reel of magnetic tape of the magnetic tape cartridge of FIG. 1, which implements the present invention.

Referring to FIGS. 1 and 2, an example of removable data storage media, such as a magnetic tape cartridge 100, comprises a cartridge body 101, cartridge door 106 and a data storage medium 121.

The data storage medium 121, for example comprising a rewritable magnetic tape, is wound on a reel 110, and a leader pin 111 is used to thread the magnetic tape 121 through the tape path of a magnetic tape drive. As is understood by those of skill in the art, a magnetic tape data storage cartridge comprises a length of magnetic tape wound on one or two reels, an example of which is those adhering to the Linear Tape Open (LTO) format. The illustrated magnetic tape cartridge 100 is a single reel cartridge. Magnetic tape cartridges may also comprise dual reel cartridges in which the tape is fed between reels of the cartridge.

One example of a magnetic tape data storage cartridge 100 is the IBM® 3580 Ultrium magnetic tape cartridge based on LTO technology. A further example of a single reel magnetic tape data storage cartridge is the IBM® 3592 TotalStorage Enterprise magnetic tape cartridge and associated magnetic tape drive. An example of a dual reel cartridge is the IBM® 3570 magnetic tape cartridge and associated drive.

In the tape cartridge 100, a brake button 112 is used to hold the tape reel 110 in place and to prevent it from rotating when tape cartridge 100 is not loaded in a tape drive. An optional tape leader 120 may be interposed between the leader pin 111 and the magnetic tape 121.

An auxiliary non-volatile memory 103, also called a cartridge memory (CM), for example, may be provided and retained in the cartridge 100, for example, by being encapsulated by the cartridge when it is assembled, as is understood by those of skill in the art.

Figure 3:
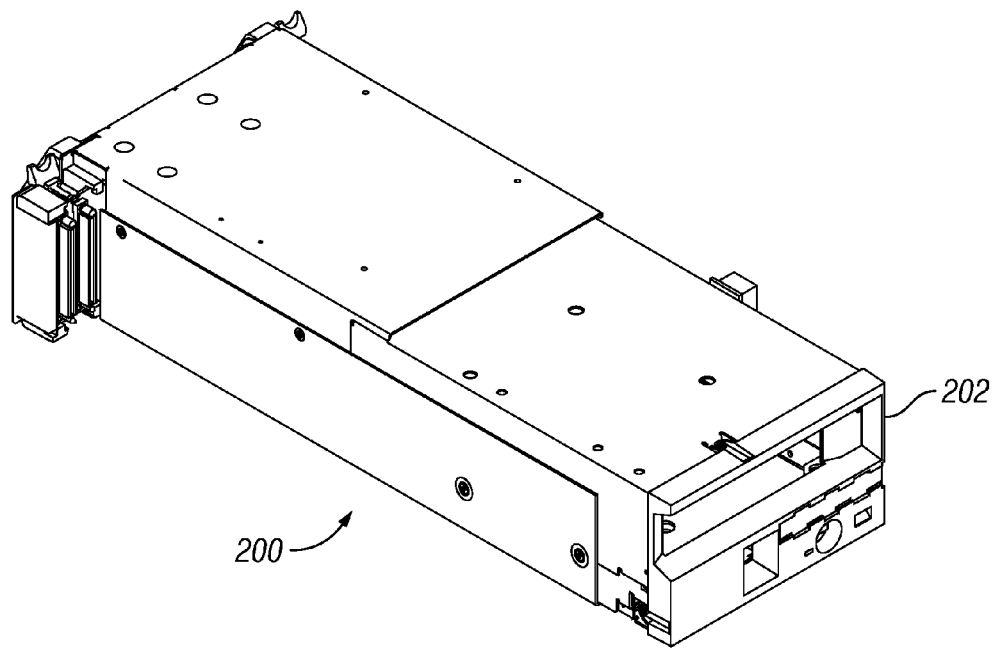
FIG. 3 is an illustration of a data storage drive which operates with the magnetic tape cartridge of FIGS. 1 and 2.
Figure 4:
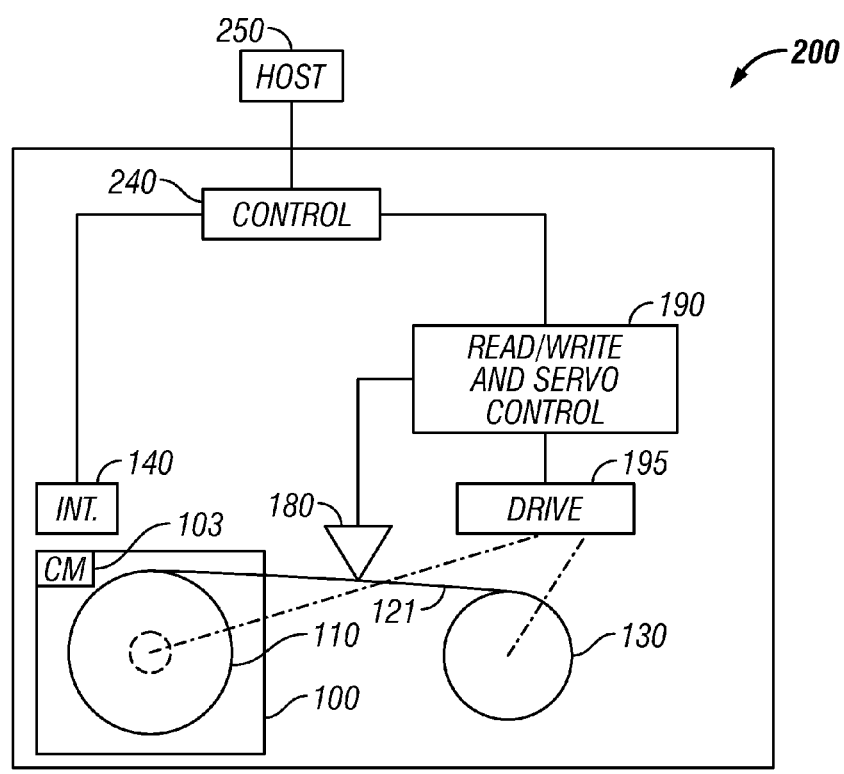
FIG. 4 is a block diagrammatic illustration of the data storage drive of FIG. 3.

Referring to FIGS. 3 and 4, a data storage drive, such as a magnetic tape drive 200, is illustrated. One example of a magnetic tape drive in which the present invention may be employed is the IBM 3580 Ultrium magnetic tape drive based on LTO technology, with microcode, etc., to perform desired operations with respect to the magnetic tape cartridge 100.

Referring to FIGS. 1-4, in the instant example, the magnetic tape cartridge 100 is inserted into opening 202 of the magnetic tape drive 200 along direction 107, and loaded in the magnetic tape drive 200.

The magnetic tape is threaded and fed between the cartridge reel 110 and a take up reel 130 in the magnetic tape drive. Alternatively, both reels of a dual reel cartridge are driven to feed the magnetic tape between the reels.

The magnetic tape drive comprises a memory interface 140 for reading information from, and writing information to, the auxiliary non-volatile memory 103 of the magnetic tape cartridge 100, for example, in a contactless manner.

A read/write system is provided for reading and writing information to the magnetic tape, and, for example, may comprise a read/write and servo head system 180 with a servo system for moving the head laterally of the magnetic tape 121, a read/write servo control 190, and a drive motor system 195 which moves the magnetic tape 121 between the cartridge reel 110 and the take up reel 130 and across the read/write and servo head system 180. The read/write and servo control 190 controls the operation of the drive motor system 195 to move the magnetic tape 121 across the read/write and servo head system 180 at a desired velocity, and, in one example, determines the longitudinal location of the read/write and servo head system with respect to the magnetic tape 121, as will be discussed.

A control system 240 communicates with the memory interface 140, and communicates with the read/write system, e.g., at read/write and servo control 190. The control system 240 may comprise any suitable form of logic, including a processor operated by software, or microcode, or firmware, or may comprise hardware logic, or a combination, as discussed in greater detail hereinafter.

The control system 240 typically communicates with one or more host systems 250, and operates the magnetic tape drive 200 in accordance with commands originating at a host. Alternatively, the magnetic tape drive 200 may form part of a subsystem, such as an automated data storage library, and may also receive and respond to commands from the subsystem.

As illustrated, the control system 240 operates the magnetic tape drive 200 to perform operations in accordance with received commands. Examples comprise moving the tape to a desired location, reading data such as a file from the tape, writing data such as new data files to the tape, or appending new data to existing files or appending new data or data files to an existing data file of a partition, rewriting or appending indexes, etc.

Figure 5:
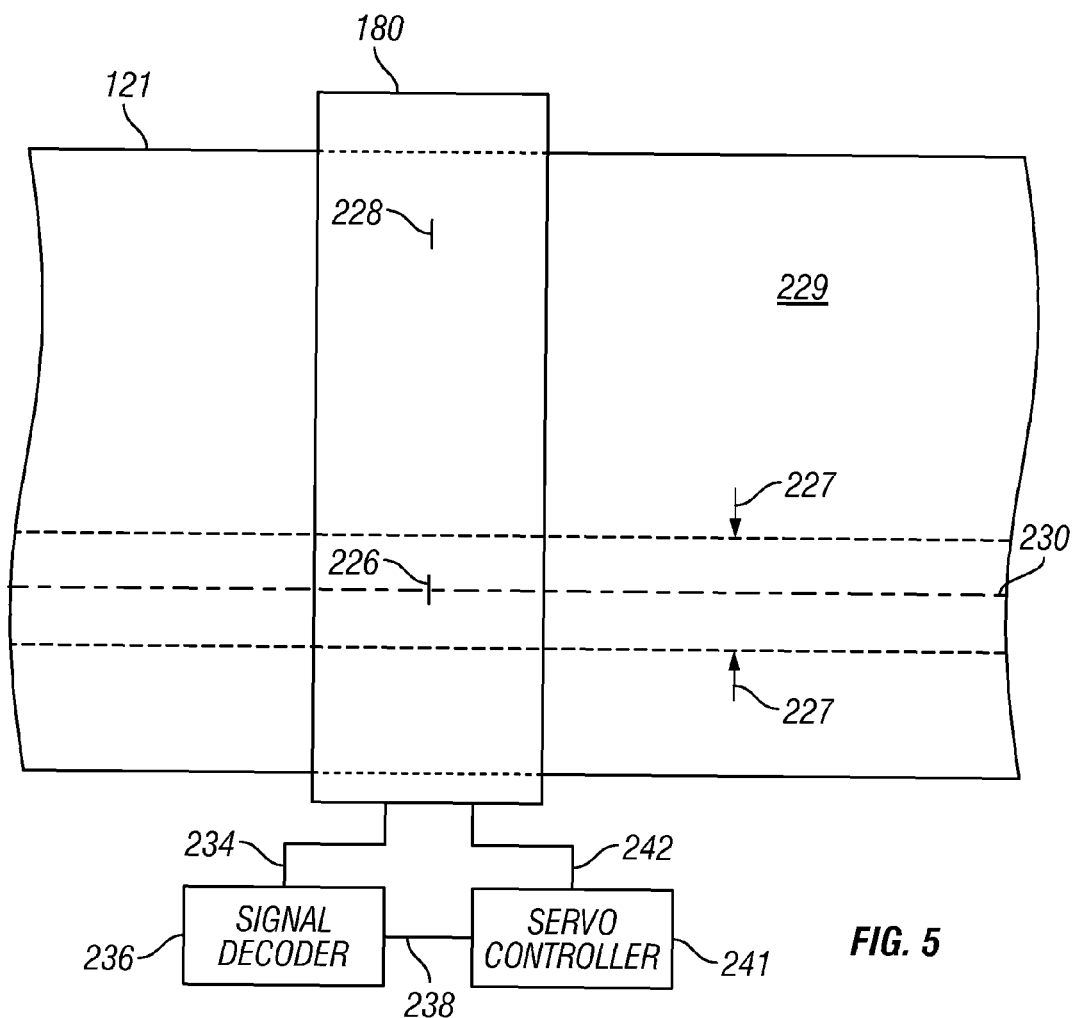
FIG. 5 is a schematic and block diagram of a magnetic head and servo system of the data storage drive and the magnetic tape cartridge of FIGS. 1-4.

Referring to FIG. 5, the magnetic tape 121 is drawn across a head system 180, which comprises a servo read head 226 that detects a servo pattern recorded in a servo band 227 of the tape. A data head 228 of the head system 180 is positioned over a data track region 229 of the tape, for example comprising multiple data tracks for reading data recorded in a data track or tracks, or for writing data in a data track or tracks. FIG. 5 shows a single servo read head and a single data head for simplicity of illustration. Those skilled in the art will appreciate that most tape systems have multiple parallel servo bands, multiple servo read heads, and multiple data read and write heads.

The servo band centerline 230 is shown as extending along the length of the tape 121. As discussed in the incorporated U.S. Pat. No. 5,689,384, the servo band is employed for track following in that magnetic transitions on the servo band are sensed by the servo head and provided on servo signal line 234 to a signal decoder 236. The signal decoder processes the servo read head signal and generates a position signal that is transmitted via position signal lines 238 to a servo controller 241. The servo controller generates a servo control signal and provides it on control lines 242 to a servo positioning mechanism at head system 180 which moves the head assembly laterally with respect to the servo band centerline 230 to a desired lateral position or to maintain the servo head at a desired lateral position with respect to the servo band 227 during track following.

The terms "servo band" and "servo track" have been used interchangeably as the term to identify a linear stream of servo stripes. Since the servo head may be positioned at any of several lateral positions across the servo band and the servo signals may be employed to track follow at a particular lateral position, the term "servo band" is employed herein to indicate a physical region which is occupied by servo stripes and avoid confusion arising from the expression "track following".

Figure 6:
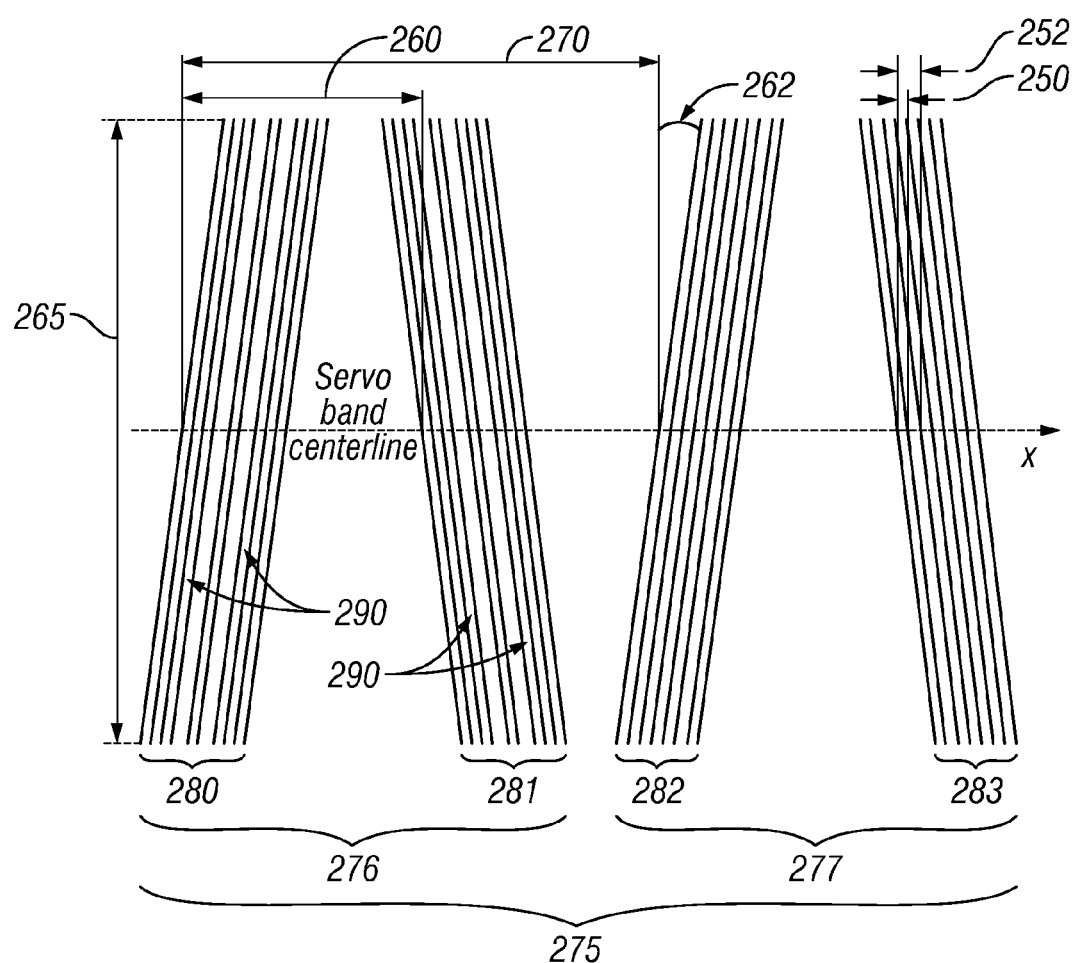
FIG. 6 is a representation of an exemplary servo pattern of the prior art.

FIG. 6 illustrates a timing based servo pattern in accordance with the prior art. A timing based servo arrangement provides track following capability. In the example, a recorded servo pattern comprises dual magnetic transitions called a "servo stripe" of width 250, and having leading or trailing (depending on the direction of movement of the tape) edges nominally separated by a distance 252. Servo stripes are arranged as pairs 260 recorded at more than one azimuthal orientation 262 across 265 the tape media. The technology is discussed in the incorporated U.S. Pat. No. 5,689,384. The servo read head traverses the servo stripes, generating a dibit for each servo stripe. The timing between the dibits of any pair, which are obtained from the servo read head, one from each burst within a subframe, thus varies continuously as a read head is moved in the lateral direction across the servo band. The pattern is read by a servo read head whose width is small compared to the servo band pattern, and servo head position is derived from the relative timing of pulses generated by the head reading the servo pattern as the tape is moved in the longitudinal direction. Position sensing with this system is achieved by deriving a ratio of two servo pattern intervals, one pattern interval comprising the timing between dibits obtained from servo stripes 260 having different azimuthal orientation, and the other pattern interval comprising the timing between dibits obtained from servo stripes 270 having the same azimuthal orientation. Thus, the position sensing is ratio dependent and is insensitive to tape speed.

A typical way to determine which servo stripe is being read is to arrange the servo stripes into patterns of servo frames 275, each frame having two sub-frames 276, 277, each with two bursts 280, 281 and 282, 283 of servo stripes arranged in different azimuthal orientations. A pattern interval is provided within a sub-frame, and another pattern interval is between sub-frames. Typically, frames and sub-frames are distinguished by having a different number of servo stripes in the bursts of one sub-frame as compared to the other sub-frame. As one example, the frames and sub-frames are easily distinguished by observing the counts of dibits in the servo signal obtained from each burst, such as 5 dibits in each burst 280, 281 of sub-frame 276, and 4 dibits in each burst 282, 283 of sub-frame 277, within a frame 275. Counting the different numbers of dibits in each burst allows the servo system to distinguish the frame boundaries.

As pointed out by the incorporated U.S. Pat. No. 5,930,065, some of the servo stripes may be shifted longitudinally 290 to provide additional information, such as the longitudinal position along the tape.

A drawback of asymmetric numbers of servo stripes in each frame is that the extra servo stripes result in longer frames, reducing the rate of generation of lateral position estimates from the servo signals, as the lateral position estimates are generated on a frame by frame basis.

Figure 7A:
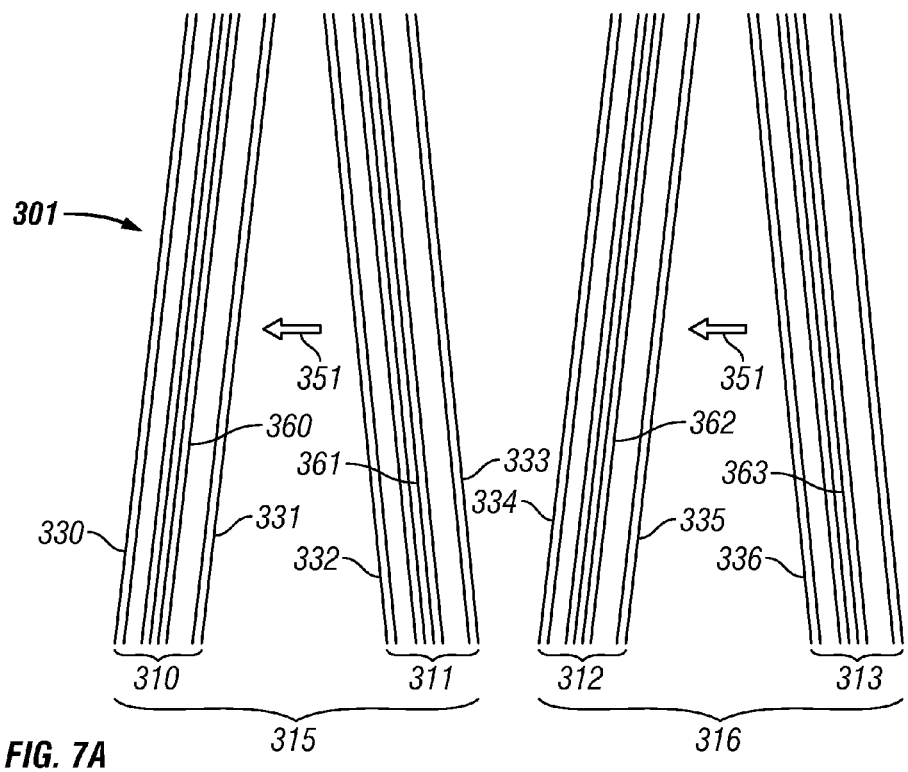
FIGS. 7A and 7B are representations of a servo pattern in accordance with the present invention.
Figure 7B:
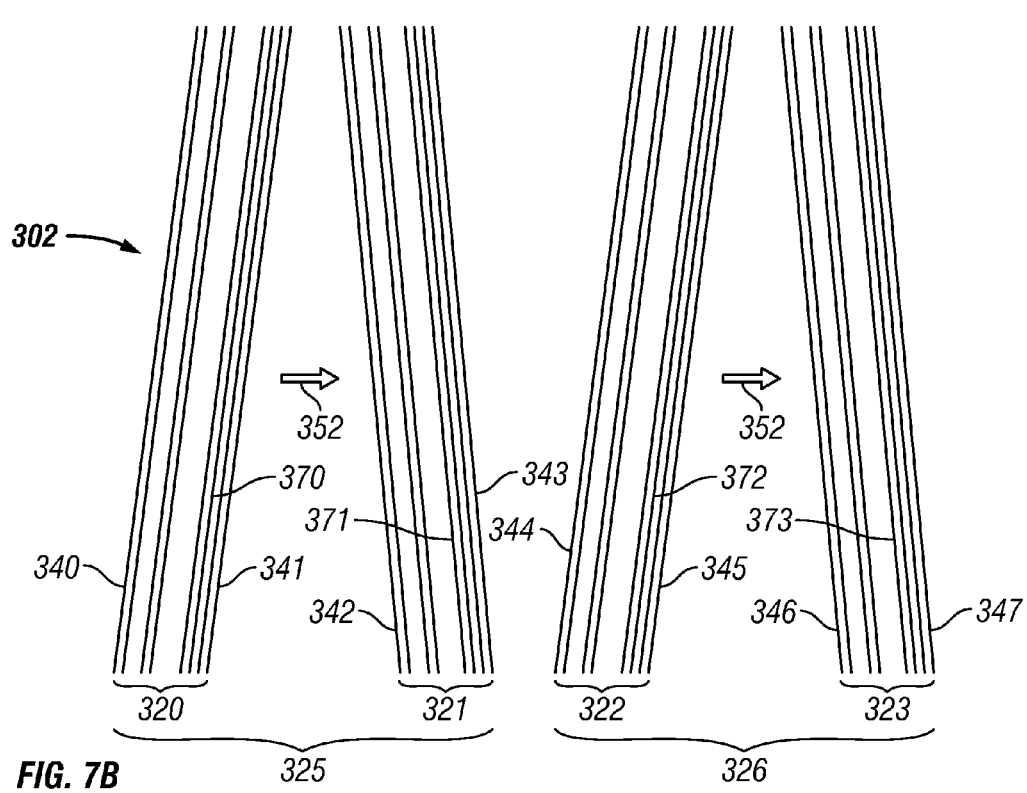

FIGS. 7A and 7B comprise a representation of a servo pattern in accordance with the present invention.

The servo frames 301 and 302 are arranged with four servo bursts with an equal number of servo stripes in each burst. Servo frame 301 comprises servo bursts 310, 311, 312, 313, and servo frame 302 comprises servo bursts 320, 321, 322, 323. The servo frames comprise two symmetric sub-frames, servo frame 301 comprising sub-frames 315, 316, and servo frame 302 comprising sub-frames 325, 326. Each sub-frame comprises two bursts of servo stripes that are parallel to each other within a burst, and the bursts are non-parallel with respect to each other. By having the same number of servo stripes in each burst of the frame, the frames 301 and 302 are symmetric, as opposed to the asymmetric frame of FIG. 6.

Still referring to FIGS. 7A and 7B, in accordance with the present invention, each servo burst is arranged to comprise at least one reference servo stripe. For example, in burst 310 of frame 301, servo stripes 330 and 331 comprise reference servo stripes. In one embodiment, the reference servo stripes are arranged to be in the same servo stripe count position within each burst. For example, burst 311 comprises reference servo stripes 332 and 333, burst 312 comprises reference servo stripes 334 and 335, and burst 313 comprises reference servo stripes 336 and 337. Thus, servo stripes 330, 332, 334 and 336 are in the same (first) count position of each burst; and servo stripes 331, 333, 335 and 337 are in the same (last) count position of each burst.

Additionally, for example, in burst 320 of frame 302, servo stripes 340 and 341 comprise reference servo stripes. With the reference servo stripes arranged to be in the same servo stripe count position within each burst, burst 321 comprises reference servo stripes 342 and 343, burst 322 comprises reference servo stripes 344 and 345, and burst 323 comprises reference servo stripes 346 and 347. Thus, servo stripes 340, 342, 344 and 346 are in the same (first) count position of each burst; and servo stripes 341, 343, 345 and 347 are in the same (last) count position of each burst.

Further in accordance with the present invention, each servo burst is arranged to comprise at least one shifted servo stripe, wherein the shift is in the same longitudinal direction with respect to at least one reference servo stripe for each burst of a frame and the opposite longitudinal direction for bursts of sequentially adjacent frames. In the example, frames 301 of FIGS. 7A and 302 of FIG. 7B are placed sequentially adjacent one another in the servo band. Thus, the shifted servo stripes of frame 301 are shifted in the plus (+) direction 351 in both sub-frames 315 and 316, and the shifted servo stripes of frame 302 are shifted in the minus (−) direction 352 in both sub-frames 325 and 326.

In one embodiment, the shifted servo stripes are arranged to be in the same servo stripe count position within each burst, and, with respect to frame 301, shifted servo stripe 360 of burst 310, shifted servo stripe 361 of burst 311, shifted servo stripe 362 of burst 312, and shifted servo stripe 363 of burst 313 are all shifted in the direction 351. With respect to frame 302, shifted servo stripe 370 of burst 320, shifted servo stripe 371 of burst 321, shifted servo stripe 372 of burst 322, and shifted servo stripe 373 of burst 323 are all shifted in the direction 352. Shifted servo stripes 360, 361, 362, 363, 370, 371, 372 and 373 are all in the same (third) count position of each burst.

The timing between each of the corresponding pairs of servo stripes remains the same, so that the timing based ratios identify the lateral position of a servo head with respect to the servo band.

The frames and sub-frames are easily distinguished by observing the shift directions of shifted servo stripes in each burst, such as the shift direction 351 for shift servo stripes in each burst 310, 311, of sub-frame 315, and each burst 312, 313 of sub-frame 316, within a frame 301, and the shift direction 352 for shift servo stripes in each burst 320, 321, of sub-frame 325, and each burst 322, 323 of sub-frame 326, within a frame 302. Sequentially adjacent sub-frames within the same frame thus have the same shift direction, and sequentially adjacent frames have the opposite shift direction, allowing the servo system to distinguish the frame boundaries.

Figure 8:
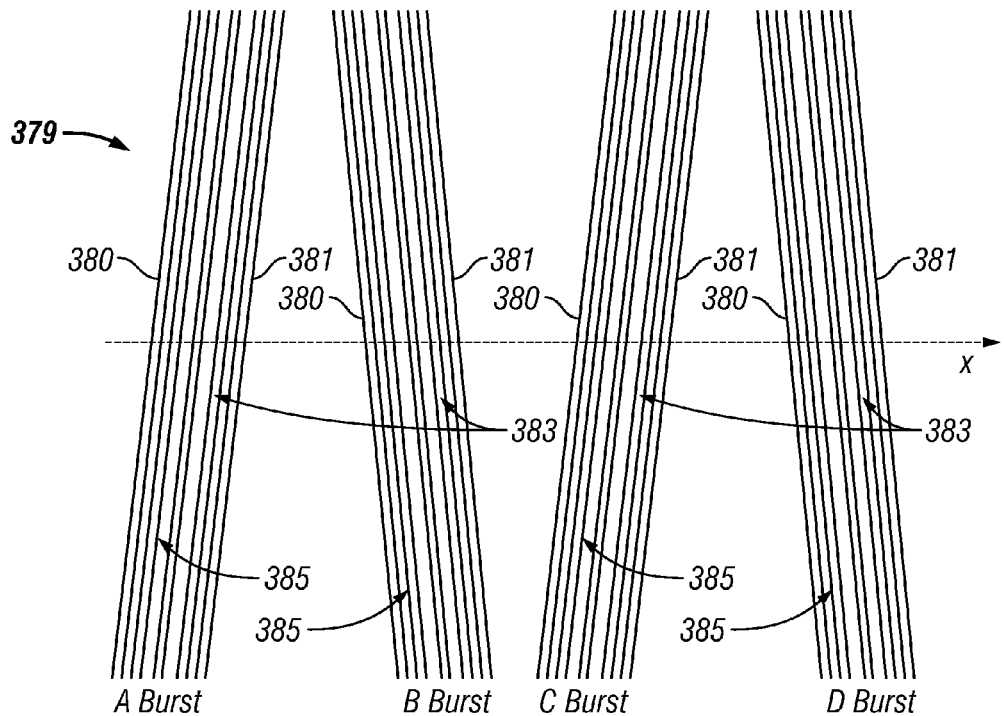
FIG. 8 is a representation of another servo pattern in accordance with the present invention.
Figure 9:
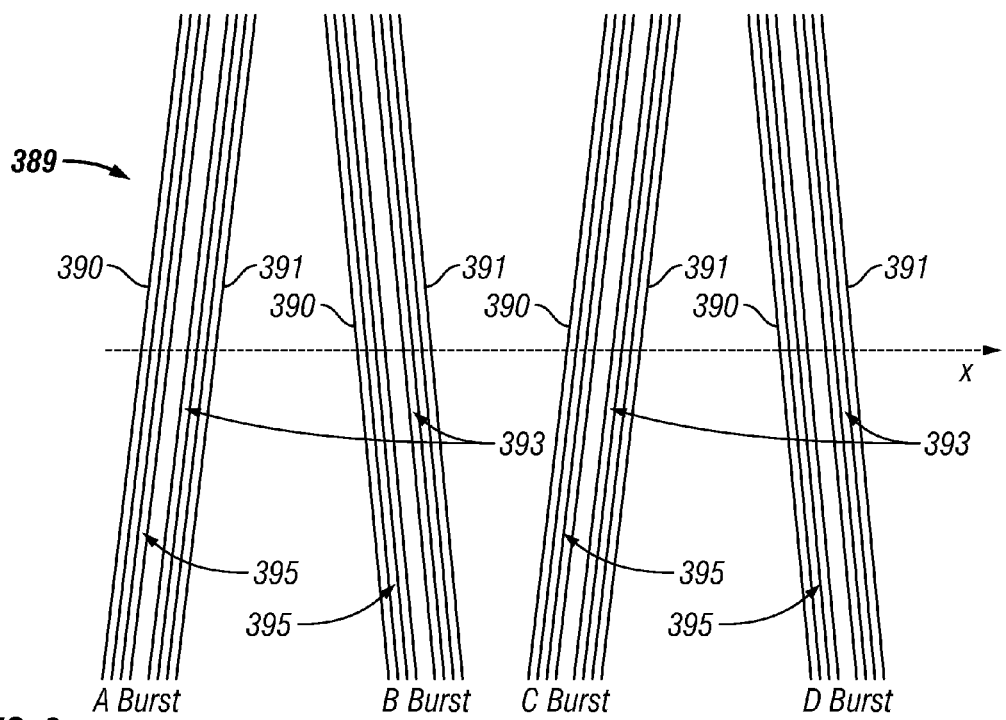
FIG. 9 is a representation of still another servo pattern in accordance with the present invention.
Figure 10:
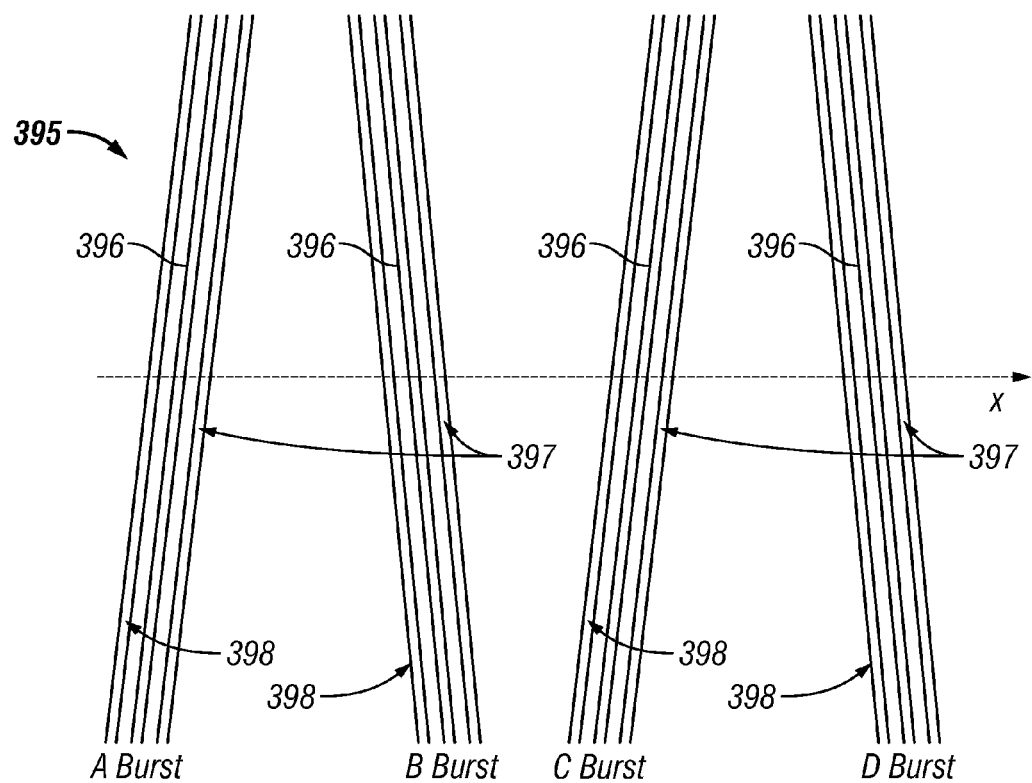
FIG. 10 is a representation of another servo pattern in accordance with the present invention.

FIGS. 8, 9, and 10 illustrate further embodiments.

In one embodiment, the reference servo stripes are arranged as the outer servo stripes of each burst; and the shifted servo stripe(s) is arranged as an interior servo stripe of each burst. Thus, in frame 379 of FIG. 8, having 5 servo stripes in each burst, servo stripes 380 comprise outer servo stripes at one edge of each burst, while servo stripes 381 comprise outer servo stripes at the opposite edge of each burst.

In frame 379, servo stripes 383 comprise the interior shifted servo stripe of each burst of the frame 379. In another embodiment, the shifted servo stripe 383 of each burst is independent of any modulated longitudinal position (LPOS) servo stripe 385 in the burst. The shifted servo stripes 383 are located by their longitudinally positioned relationship with respect to reference servo stripes 380 and 381, such that, if the direction of tape motion makes reference servo stripes 380 the leading edge of each burst, the shifted servo stripe 383 is expected to be the third servo stripe after the reference servo stripe 380. If the direction of tape motion makes reference servo stripes 381 the leading edge of each burst, the shifted servo stripe 383 is expected to be the first servo stripe after the reference servo stripe 381.

In frame 389 of FIG. 9, having 4 servo stripes in each burst, servo stripes 390 comprise outer servo stripes at one edge of each burst, while servo stripes 391 comprise outer servo stripes at the opposite edge of each burst.

In frame 389, servo stripes 393 comprise the interior shifted servo stripe of each burst of the frame 389. In another embodiment, the shifted servo stripe 393 of each burst is independent of any modulated longitudinal position (LPOS) servo stripe 395 in the burst. The shifted servo stripes 393 are located by their longitudinally positioned relationship with respect to reference servo stripes 390 and 391, such that, if the direction of tape motion makes reference servo stripes 390 the leading edge of each burst, the shifted servo stripe 393 is expected to be the second servo stripe after the reference servo stripe 390. If the direction of tape motion makes reference servo stripes 391 the leading edge of each burst, the shifted servo stripe 393 is expected to be the first servo stripe after the reference servo stripe 391.

In another embodiment illustrated by frame 395 of FIG. 10, wherein each burst comprises three servo stripes, a reference servo stripe 396 of each said burst is arranged at the interior position of the burst, and a shifted servo stripe 397 is arranged at an edge of each burst, adjacent the reference servo stripe 396. In another embodiment, the shifted servo stripe 397 of each burst is independent of any modulated longitudinal position (LPOS) servo stripe 398 in the burst. The shifted servo stripes 397 are located by their longitudinally positioned relationship with respect to reference servo stripes 396 or with respect to the edge of the burst, such that, if the direction of tape motion makes servo stripes 398 the leading edge of each burst, the shifted servo stripe 397 is expected to be the first after the reference servo stripe 396. If the direction of tape motion makes the shifted servo stripes 397 the leading edge of each burst, the shifted servo stripe 397 is expected to be the first servo stripe encountered for the burst.

Figure 11:
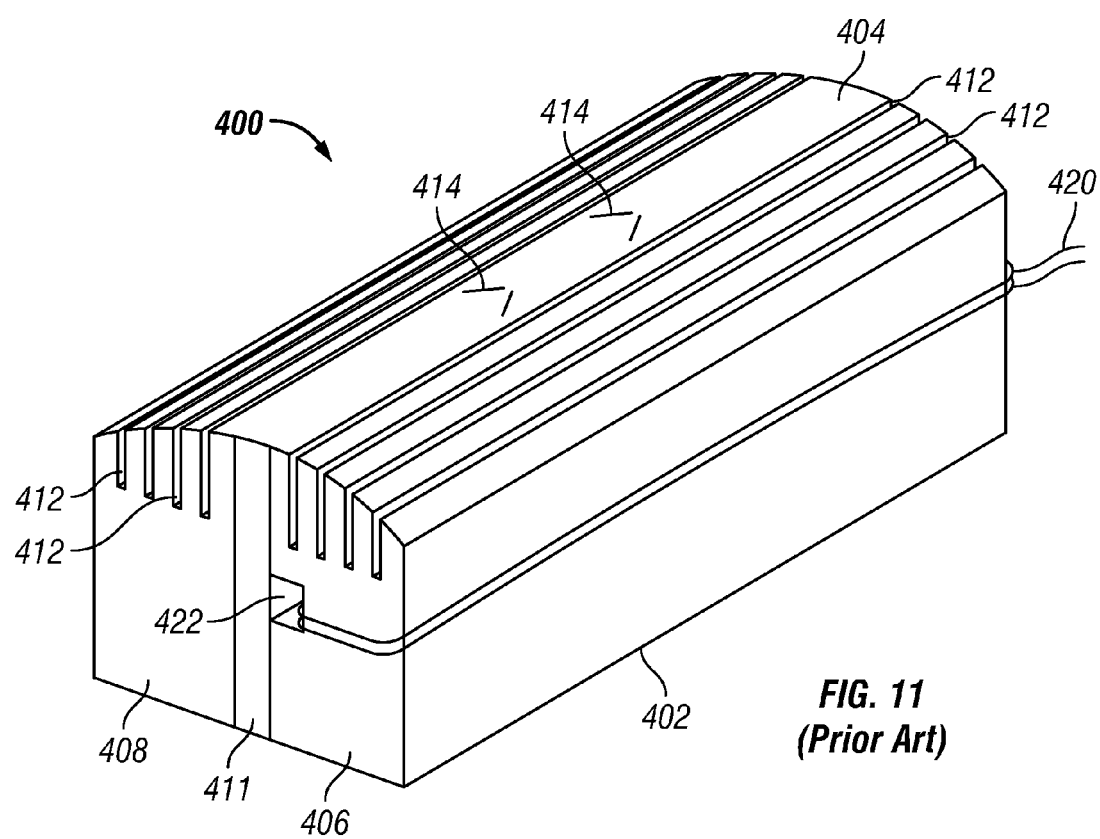
FIG. 11 is a perspective representation of a prior art multi-gap head that can write servo stripes of the present invention.

FIG. 11 illustrates a prior art magnetic head assembly 400, taken from the incorporated U.S. Pat. No. 5,689,384, that may be employed, in one example, for recording the servo pattern of the present invention. The illustrated head comprises a ferrite ring 402 with a patterned pole piece region 404. Two ferrite blocks 406, 408 form the bulk of the magnetic head and are separated by a spacer 411. A cylindrical contour of the surface is provided, and cross slots 412 are cut into the head to remove included air when the head is in operation with magnetic tape. A pattern 414 representing a pair of servo stripes is created in the tape head. A coil 420 is wound around one of the ferrite blocks 408 through a wiring slot 422 to complete the head. The head assembly 400 is illustrated as having two sets of servo patterns, and may have a greater or lesser number of patterns 414. Further, the patterns 414 may be offset relative to one another in the longitudinal direction of the tape.

Figure 12:
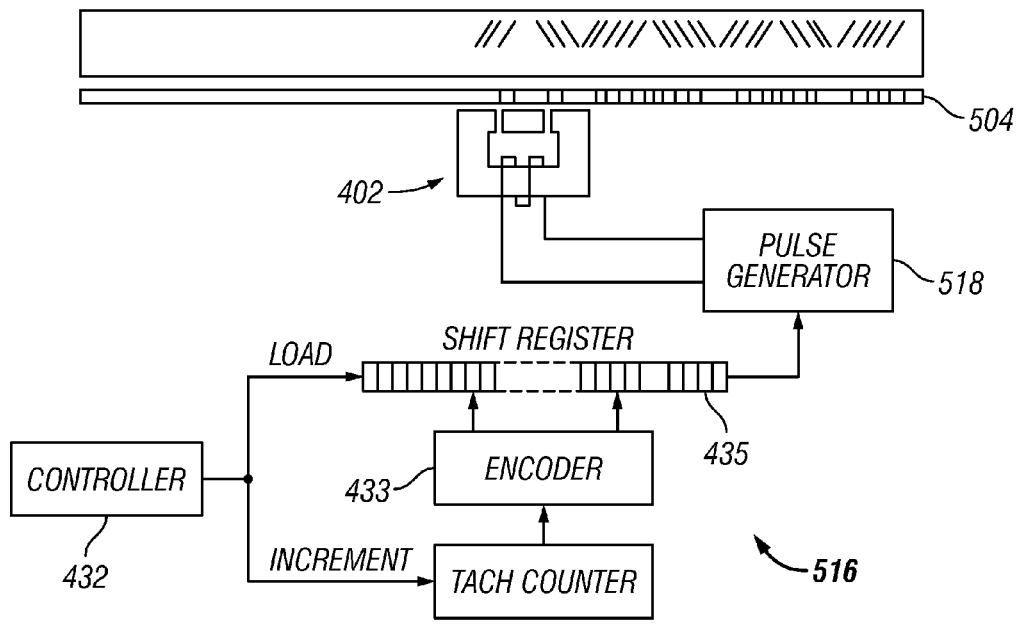
FIG. 12 is a schematic and block diagram representation of a writing generator for writing the servo stripes of the present invention.
Figure 13:
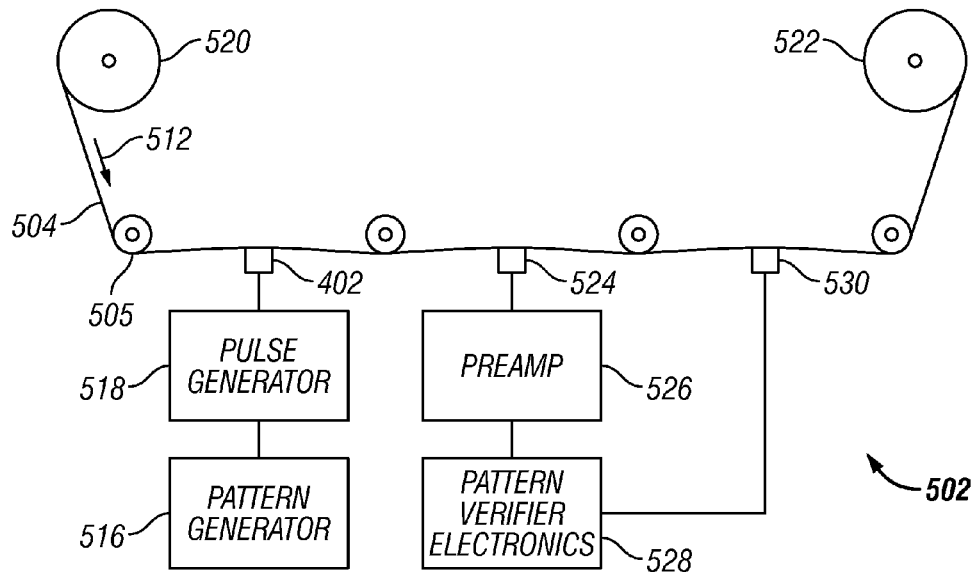
FIG. 13 is an overall schematic representation of the writing system of FIGS. 11 and 12.

In FIGS. 12 and 13, a tape 504 is moved between reels 520 and 522 in the direction of arrow 512. Pattern generator 516 comprises a controller 432 and encoder 433. The encoded information to conduct the plus (+) and minus (−) shifts of the shifted servo stripes are loaded from the encoder to the shift register 435 under the control of the controller and is shifted to pulse generator 518. The LPOS information may also be loaded from the encoder to the shift register. The shift register represents the timing of the supply of pulses by the pulse generator 518 to cause head 402 to write each pair of servo stripes on the tape 504. Thus, the shift register controls the timing of the pulses that create the servo stripes and thereby controls the plus (+) and minus (−) shifts of the shifted servo stripes.

The shift register also controls the shifts of the LPOS information. As discussed in the incorporated U.S. Pat. No. 5,930,065, longitudinal positioning information may be encoded into the patterns by longitudinally shifting a selected servo stripe in one or multiple bursts, modifying the timing of the selected servo stripe.

After the tape 504 is written with the servo bands, the servo pattern is verified by a servo read head 524 reading the just-recorded servo pattern and provides the signal to a pre-amplifier 526 and a pattern verifier 528 that, among other tests, verifies that every other frame (such as every even frame) has shifted servo stripes that are shifted in a first direction, and every sequentially adjacent frame (such as every odd frame) has shifted servo stripes that are shifted in the opposite direction.

In one example, the pattern generator 516 and pattern verifier 528 may comprise hardware elements and may comprise any suitable form of logic, including a processor operated by software, or microcode, or firmware, or may comprise hardware logic, or a combination.

Figure 14:
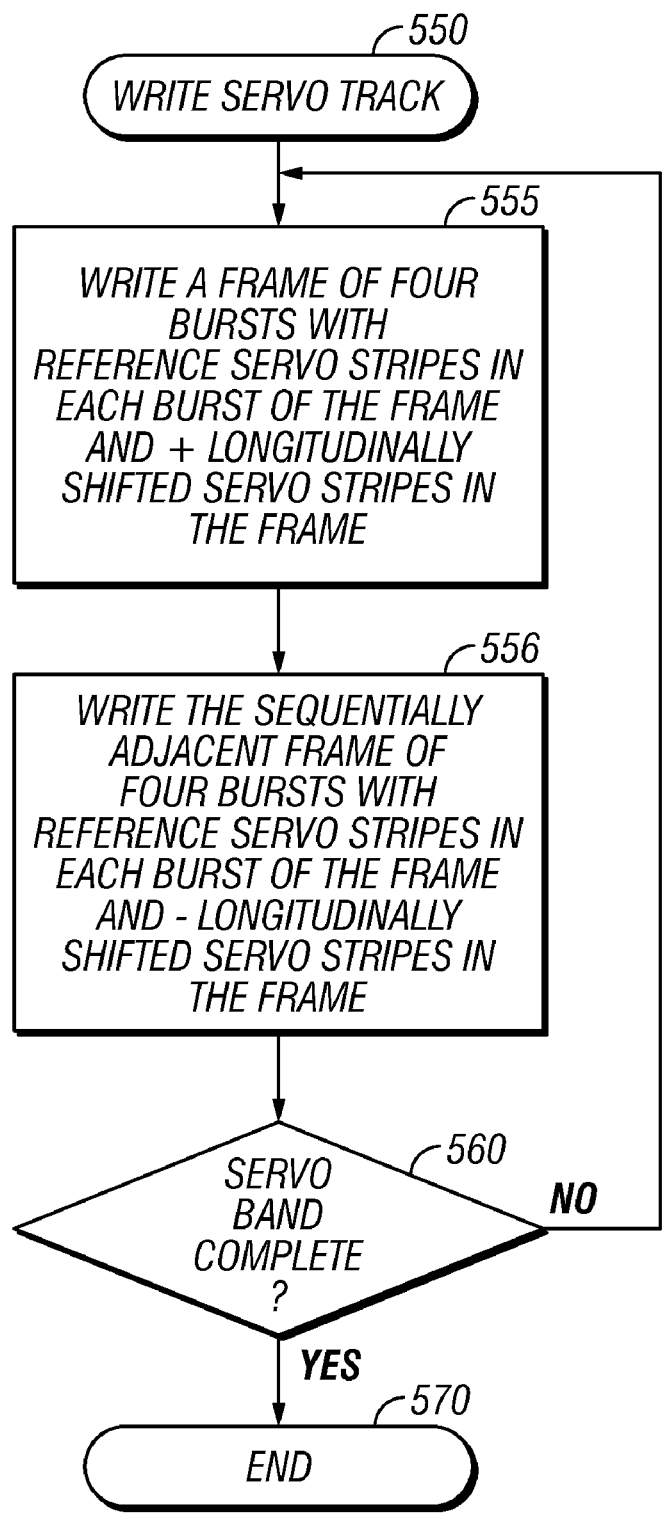
FIG. 14 is a flow chart depicting an exemplary method of operating the system of FIGS. 11-13.

In FIG. 14, the method for providing a servo band is illustrated as beginning at step 550. Step 555 comprises writing a frame of four servo bursts with an equal number of servo stripes in each burst, the servo frame comprising two symmetric sub-frames, each sub-frame comprising two bursts of servo stripes that are parallel to each other within a burst, and the bursts are non-parallel with respect to each other. Each servo burst is arranged to comprise at least one reference servo stripe; and each servo burst is arranged to comprise at least one shifted servo stripe, wherein the shift is in the same longitudinal direction with respect to at least one reference servo stripe for each burst of a frame. The shift direction may be called the plus (+) direction.

Step 556 comprises writing the sequentially adjacent frame, also with four servo bursts with an equal number of servo stripes in each burst, the servo frame comprising two symmetric sub-frames, each sub-frame comprising two bursts of servo stripes that are parallel to each other within a burst, and the bursts are non-parallel with respect to each other. Each servo burst is arranged to comprise at least one reference servo stripe; and each servo burst is arranged to comprise at least one shifted servo stripe, wherein the shift is in the opposite longitudinal direction. The shift direction may be called the minus (−) direction.

Step 560 determines whether the servo band is complete, and if not, returns to step 555 to write the next frame.

If the servo band is complete, per step 560, the process ends at step 570.

Referring to FIG. 4, a tape with a completed servo band is read by head 180, and read/write and servo control 190 detects the timing based spacing between selected sensed servo stripes; and comprises a decoder configured to respond to the detected spacing to identify reference servo stripes of the bursts; to detect position shifts of servo stripes of each burst, wherein the shift is in the same longitudinal direction with respect to at least one reference servo stripe for each burst of a frame, and the opposite longitudinal direction for bursts of sequentially adjacent frames, and decodes the detected position shifts to identify the frames.

Once the frames are identified, the read/write and servo control 190 is able to detect the timing between pairs of dibits obtained from corresponding pairs of servo stripes, and thereby detect the lateral position of the head 180 with respect to the servo band. Additionally, the read/write and servo control 190 is able to detect the timing of the LPOS dibits and hence recover the longitudinal information encoded into the LPOS dibits, as known in the art.

In one example, the read/write and servo head system 180 and read/write and servo control 190 may comprise hardware elements and may comprise any suitable form of logic, including a processor operated by software, or microcode, or firmware, or may comprise hardware logic, or a combination.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for synchronization of timing based servo bursts of servo frames of a longitudinal servo band, comprising:

arranging said servo frames with four servo bursts with an equal number of servo stripes in each burst, said servo frames comprising two symmetric sub-frames, each sub-frame comprising two bursts of servo stripes that are parallel to each other within a burst, and said bursts are non-parallel with respect to each other;

arranging each said servo burst to comprise at least one reference servo stripe; and arranging each said servo burst to comprise at least one shifted servo stripe, wherein said shift is in the same longitudinal direction with respect to said at least one reference servo stripe for each burst of a frame and in the opposite longitudinal direction for bursts of sequentially adjacent frames; such that said shifts in the opposite longitudinal direction distinguish said sequentially adjacent frames from each other.

2. The method of claim 1, wherein said step of arranging said reference servo stripes comprises arranging said reference servo stripes to be in the same servo stripe count position within each said burst; and said step of arranging said shifted servo stripes comprises arranging said shifted servo stripes to be in the same servo stripe count position within each said burst.

3. The method of claim 2, wherein said step of arranging said reference servo stripes comprises arranging said at least one reference servo stripe at the same outer edge of each said burst.

4. The method of claim 3, wherein said at least one shifted servo stripe of each said burst is independent of any modulated longitudinal position (LPOS) servo stripe in said burst.

5. The method of claim 3, wherein each said burst comprises three servo stripes; said step of arranging said reference servo stripes comprises arranging at least one said reference servo stripe of each said burst at the interior position of said burst; and said step of arranging said shifted servo stripe comprises arranging said shifted servo stripe at an edge of each said burst, adjacent said reference servo stripe.

6. The method of claim 3, wherein said step of arranging said reference servo stripes comprises arranging said reference servo stripes as the outer servo stripes of each said burst; and said step of arranging said shifted servo stripes comprises arranging said at least one shifted servo stripe as an interior servo stripe of each said burst.

7. The method of claim 6, wherein each said burst comprises four servo stripes; and said step of arranging said shifted servo stripes comprises arranging at least one said shifted interior servo stripe of each said burst adjacent one of said reference servo stripes.

8. The method of claim 6, wherein each said burst comprises five servo stripes; and said step of arranging said shifted servo stripes comprises arranging at least one said shifted interior servo stripe of each said burst adjacent one of said reference servo stripes.

9. A magnetic tape medium having prerecorded servo information recorded in magnetic flux servo stripe patterns of timing based servo bursts of servo frames, defining at least one longitudinal servo band, comprising:

said servo frames having four servo bursts with an equal number of servo stripes in each burst, said servo frames comprising two symmetric sub-frames, each sub-frame comprising two bursts of servo stripes that are parallel to each other within a burst, and said bursts are non-parallel with respect to each other;

each said servo burst comprising at least one reference servo stripe; and each said servo burst comprising at least one shifted servo stripe, wherein said shift is in the same longitudinal direction with respect to said at least one reference servo stripe for each burst of a frame and in the opposite longitudinal direction for bursts of sequentially adjacent frames; such that said shifts in the opposite longitudinal direction distinguish said sequentially adjacent frames from each other.

10. The magnetic tape medium of claim 9, wherein said reference servo stripes are in the same servo stripe count position within each said burst; and said shifted servo stripes are in the same servo stripe count position within each said burst.

11. The magnetic tape medium of claim 10, wherein said at least one reference servo stripe is at the same at least one outer edge of each said burst.

12. The magnetic tape medium of claim 11, wherein said at least one shifted servo stripe of each said burst is independent of any modulated longitudinal position (LPOS) servo stripe in said burst.

13. The magnetic tape medium of claim 11, wherein each said burst comprises three servo stripes; at least one reference servo stripe is at the interior position of each said burst; and said shifted servo stripe is at an edge of each said burst, adjacent said reference servo stripe.

14. The magnetic tape medium of claim 11, wherein reference servo stripes are the outer servo stripes of each said burst; and said at least one shifted servo stripe is at least one interior servo stripe of each said burst.

15. The magnetic tape medium of claim 14, wherein each said burst comprises four servo stripes; and at least one said shifted interior servo stripe of each said burst is adjacent one of said reference servo stripes.

16. The magnetic tape medium of claim 14, wherein each said burst comprises five servo stripes; and at least one said shifted interior servo stripe of each said burst is adjacent one of said reference servo stripes.

17. A sensible transition pattern of timing based servo stripes recorded as bursts in frames defining at least one longitudinal track, comprising:
    said frames having four bursts with an equal number of servo stripes in each burst, said frames comprising two symmetric sub-frames, each sub-frame comprising two bursts of servo stripes that are parallel to each other within a burst, and said bursts are non-parallel with respect to each other;
    each said burst comprising at least one reference servo stripe; and
    each said burst comprising at least one shifted servo stripe, wherein said shift is in the same longitudinal direction with respect to said at least one reference servo stripe for each burst of a frame and in the opposite longitudinal direction for bursts of sequentially adjacent frames; such that said shifts in the opposite longitudinal direction distinguish said sequentially adjacent frames from each other.

18. The sensible transition pattern of servo stripes of claim 17, wherein said reference servo stripes are in the same servo stripe count position within each said burst; and said shifted servo stripes are in the same servo stripe count position within each said burst.

19. The sensible transition pattern of servo stripes of claim 18, wherein said at least one reference servo stripe is at the same at least one outer edge of each said burst.

20. The sensible transition pattern of servo stripes of claim 19, wherein each said burst comprises three servo stripes; at least one reference servo stripe is at the interior position of each said burst; and said shifted servo stripe is at an edge of each said burst, adjacent said reference servo stripe.

21. The sensible transition pattern of servo stripes of claim 19, wherein reference servo stripes are the outer servo stripes of each said burst; and said at least one shifted servo stripe is at least one interior servo stripe of each said burst.

22. The sensible transition pattern of servo stripes of claim 21, wherein each said burst comprises four servo stripes; and at least one said shifted interior servo stripe of each said burst is adjacent one of said reference servo stripes.

23. The sensible transition pattern of servo stripes of claim 21, wherein each said burst comprises five servo stripes; and at least one said shifted interior servo stripe of each said burst is adjacent one of said reference servo stripes.

24. A magnetic tape servo writer, comprising:
    at least two spaced apart write elements configured to write magnetic flux timing based servo stripes;
    a drive configured to move a magnetic tape longitudinally across said write elements at a predetermined velocity;
    a source of timed pulses configured to cause said spaced apart write elements to write said magnetic flux servo stripes; and
    an encoder configured to shift the timing of said source of timing pulses to write patterns of timing based servo bursts of servo frames, defining at least one longitudinal servo band, comprising:
        said servo frames having four servo bursts with an equal number of servo stripes in each burst, said servo frames comprising two symmetric sub-frames, each sub-frame comprising two bursts of servo stripes that are parallel to each other within a burst, and said bursts are non-parallel with respect to each other;
        each said servo burst comprising at least one reference servo stripe; and
        each said servo burst comprising at least one shifted servo stripe, wherein said shift is in the same longitudinal direction with respect to said at least one reference servo stripe for each burst of a frame and in the opposite longitudinal direction for bursts of sequentially adjacent frames; such that said shifts in the opposite longitudinal direction distinguish said sequentially adjacent frames from each other.

25. A magnetic tape servo detection system configured to be responsive to sensed servo stripes of a longitudinal servo band having timing based bursts of said servo stripes arranged in frames recorded on a magnetic tape media, comprising:
    a detection system configured to detect the timing based spacing between selected said sensed servo stripes; and
    a decoder configured to respond to said detected spacing to identify said timing based bursts, to identify reference servo stripes of said bursts; to detect position shifts of servo stripes of each said burst, and to detect the longitudinal direction of said detected shifted servo stripes, wherein said shift is in the same longitudinal direction with respect to said at least one reference servo stripe for each burst of a frame and in the opposite longitudinal direction for bursts of sequentially adjacent frames, such that said shifts in the opposite longitudinal direction distinguish said sequentially adjacent frames from each other, and to decode said detected longitudinal directions of said position shifts to identify said frames.

* * * * *